Aug. 18, 1925.

G. A. BROWN 1,550,498

CONVERTIBLE VEHICLE BODY

Filed May 19, 1925   3 Sheets-Sheet 1

WITNESSES

INVENTOR
GEORGE A. BROWN
BY
ATTORNEYS

Figures 2, 3:
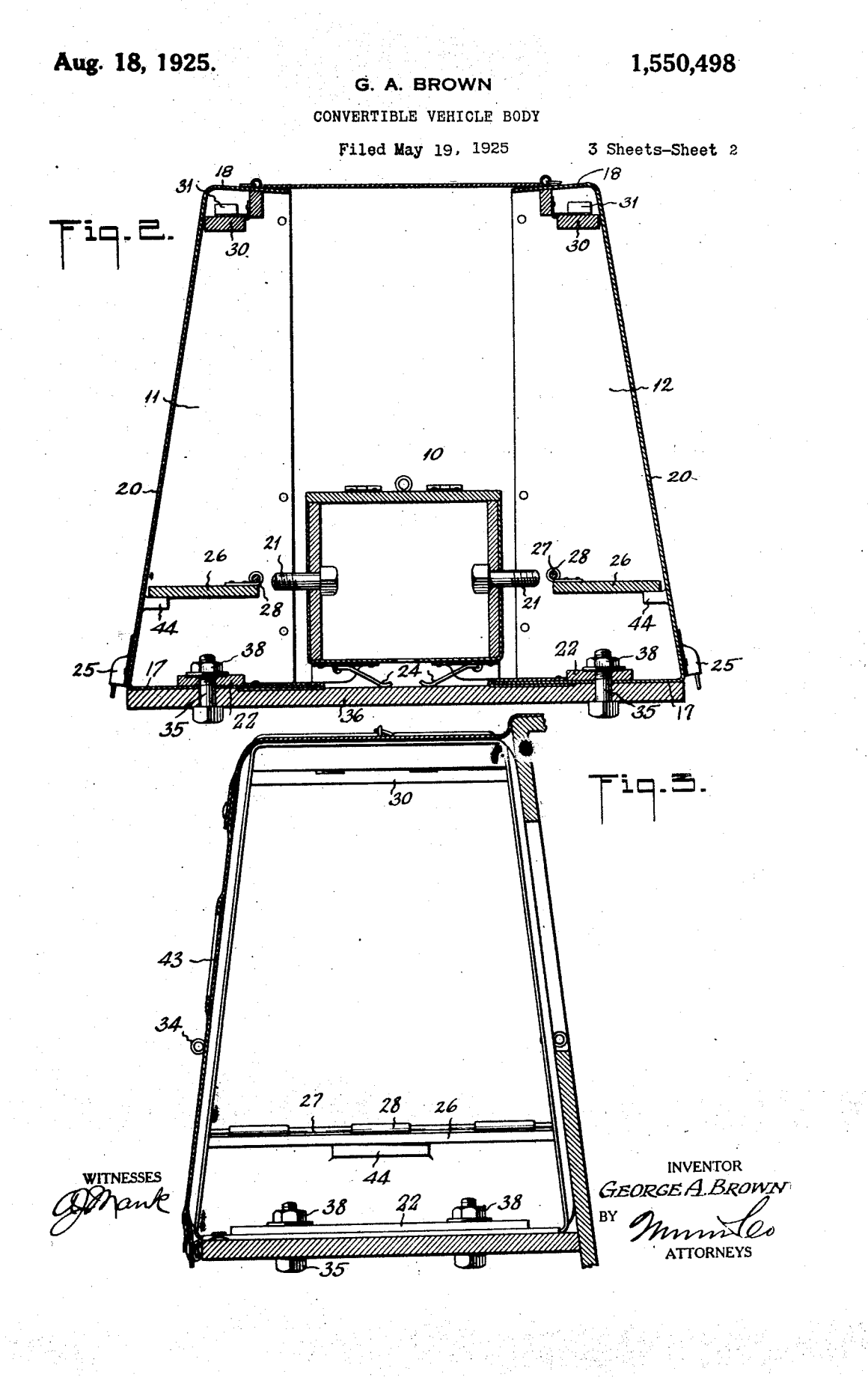

Aug. 18, 1925.

G. A. BROWN 1,550,498

CONVERTIBLE VEHICLE BODY

Filed May 19, 1925 3 Sheets-Sheet 2

WITNESSES

INVENTOR
GEORGE A. BROWN
BY
ATTORNEYS

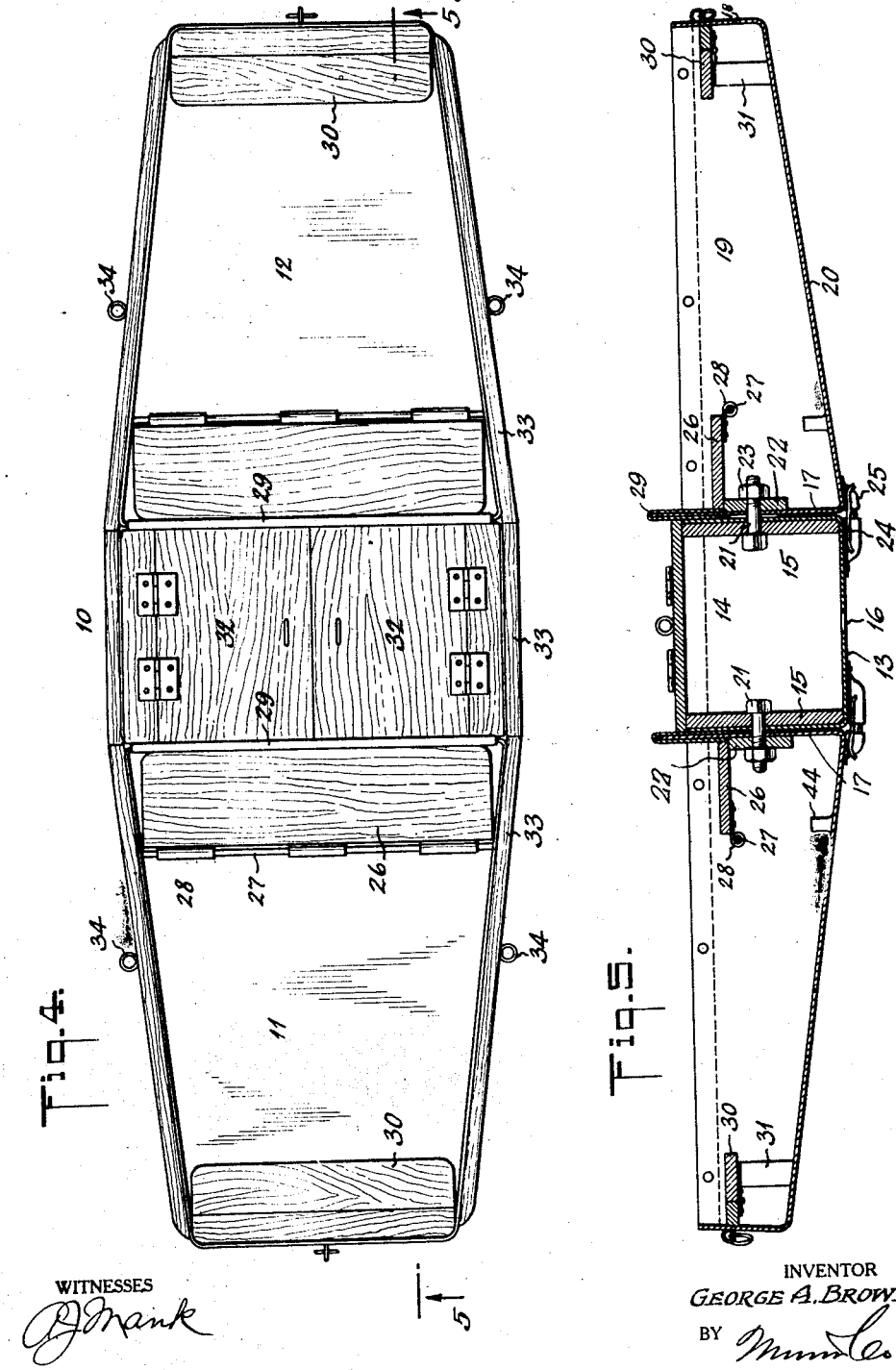

Patented Aug. 18, 1925.

1,550,498

UNITED STATES PATENT OFFICE.

GEORGE ANDREW BROWN, OF ROCKVILLE CENTER, NEW YORK.

CONVERTIBLE VEHICLE BODY.

Application filed May 19, 1925. Serial No. 31,377.

*To all whom it may concern:*

Be it known that I, GEORGE A. BROWN, a citizen of the United States of America, and resident of Rockville Center, in the county of Nassau and State of New York, have invented a new and Improved Convertible Vehicle Body, of which the following is a full, clear, and exact description.

This invention relates to convertible vehicle bodies and has particular reference to a convertible boat and cab.

The invention comprehends a knock-down portable boat adapted when in knocked-down condition to be combined with an automobile to constitute a cab for the accommodation of passengers.

One of the principal objects of the present invention is to provide a portable boat having detachably associated sections which when in separated condition are designed to be combined with an automobile body to constitute a cab for the accommodation of passengers or baggage and in which the conversion of the body from a cab to a boat or vice versa may be readily accomplished.

The invention furthermore comprehends a knock-down boat which includes a mid-section and end section having detachable means of connection therebetween and in which the mid-section is in open communication with the water when the boat is launched to constitute a stabilizing means and to afford a live box for bait and fish.

The invention furthermore comprehends a convertible body having shiftable seats capable of adjustment to different positions in accordance with the use to which the body is converted.

As a still further object the invention resides in a convertible vehicle body for use selectively as a boat and a cab for an automobile, means for securing the separable sections in juxtaposition whereby the conversion of the body to its several purposes may be effected in a minimum of time and with a minimum of effort.

The invention furthermore comprehends a convertible structure of the character set forth which is comparatively simple in its construction, inexpensive to manufacture and which is efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Fig. 2 is a transverse sectional view thereof.

Fig. 3 is a longitudinal sectional view thereof.

Fig. 4 is a plan view of the convertible body converted into a boat.

Fig. 5 is a longitudinal sectional view therethrough taken approximately on the line 5—5 of Fig. 4.

Figure 1:
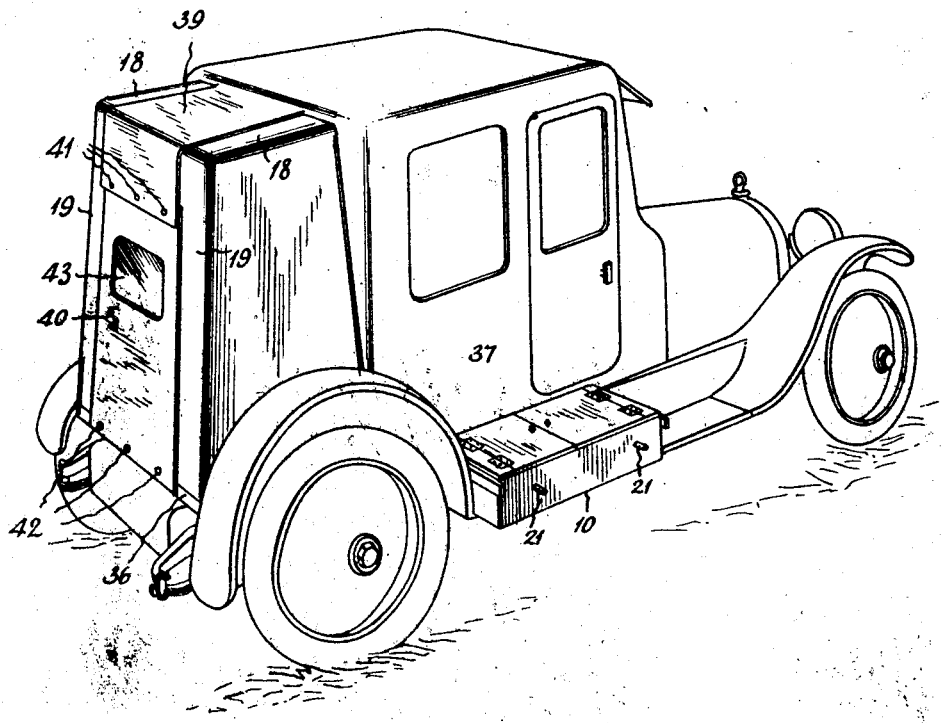
Figure 1 is a perspective view illustrating the convertible body as a cab associated with an automobile.

Referring to the drawings by characters of reference the convertible body includes a mid-section 10 and end sections 11 and 12. The mid-section 10 includes a bottom, side and end walls 13, 14 and 15, the bottom wall having openings 16 therein for permitting of the ingress of water thereto when the boat is launched whereby a constant level within the mid-section is maintained equal to the draft of the boat. The end sections 11 and 12 which are of identical construction include inner and outer end walls 17 and 18, side walls 19 and upwardly and outwardly inclined bottom walls 20 which define displacement compartments to cause the boat to float while the mid-section serves as a stabilizing means and may constitute a live box for bait and fish. The inner end walls 17 of the outer sections 11 and 12 are brought into contiguous relation with the end walls 14 of the mid-section 10. The securing means for detachably connecting the sections together consists of bolts or threaded stems 21 which extend through openings in the end walls 17 and the strengthening cross or brace strips 22. The nuts 23 are threaded on the stems to draw and maintain the end walls 15 and 17 in closed relation. In order to further lock the sections in assembled relation, the bottom wall 13 of the mid-section is provided adjacent its ends with latch elements 24 which engage over keeper elements 25 on the innermost ends of the bottom wall 20 of the outer sections 11 and 12. Adjacent the inner end wall 17 seats 26 are provided which are pivoted or hinged on cross rods 27 by means of the hinge knuckles 28. The free edge of the seat is adapted to rest upon the cross brace 22 and the inner wall 17 extends upwardly above the side wall 19 to afford a back rest 29 for the seat 26. Adjacent the outer end of each section 11 and 12 is a hinged seat 30 which has a supporting foot 31 hinged thereto for holding the same in raised supporting position when desirable. The mid-section may, if desirable, be provided with covering doors 32. The sides of the mid-section and outer sections may be provided with the gunwales 33 adjacent their upper edges and oar lock sockets 34 provided on the gunwales.

When the boat is knocked down and converted into a cab, the alined openings in the end wall 17 and the brace strips 22 are designed to be engaged over the upwardly projecting threaded stems or bolts 35 of the rear platform 36 of the vehicle 37 so that the open sides of the sections 11 and 12 are arranged in confronting relation and secured in place by the engagement of the nuts 38 with the bolts 35. The rear curtain 39 of the vehicle is brought over the ends 18 and side walls 19 of the sections 11 and 12 and a curtain section 40 is secured by separable fastening elements 41 to the free edge of the vehicle curtain 39 and secured by separable fastening elements 42 to the rear edge of the platform 36. The curtain section 40 is preferably provided with a window opening 43. In this position the seats 26 are swung on their hinges 29 to engage the supporting lugs 44 which project inwardly from the bottom 20 of the end sections so that a horizontal seat is provided in each section for the occupants of the cab. When the cab is not occupied by passengers the mid-section 10 may be placed therein as illustrated in Fig. 2 or when the cab is to be occupied by passengers the mid-section 10 may be suitably carried on the running board as illustrated in Fig. 1.

When it is desired to convert the cab into a boat, the end sections 11 and 12 are removed from the platform 36 and assembled with the mid-section 10 as clearly illustrated in Figs. 4 and 5.

I claim:

1. The combination with a vehicle having a platform, of a convertible structure comprising a pair of detachably connected sections each having an open side and adapted when disconnected to be arranged in a vertical position on the platform with the open sides in confronting relation to constitute a cab, said sections adapted to be arranged and secured in a horizontal end to end relation with the open sides up to constitute a boat.

2. A combination boat and cab comprising a body including a pair of end sections, a mid-section, interengageable means for connecting the end sections to the mid-section, to constitute a boat and interengageable means of connection between the vehicle and end sections when disassociated for disposing said sections in a vertical confronting relation to serve as a cab for accommodating the mid-section and passengers.

3. A convertible structure adapted to constitute a cab for vehicles and a boat comprising a pair of sections and means for respectively attaching the sections in vertical confronting relation to the vehicle to constitute a cab and to each other in horizontal alinement to constitute a boat.

4. A convertible structure adapted to constitute a cab for vehicles and a boat comprising a pair of sections and means for respectively attaching the sections in vertical confronting relation to the vehicle to constitute a cab and to each other in horizontal alinement to constitute a boat, and hinged seats in said sections shiftable to and supportable in a horizontal position irrespective of the position of the sections.

5. A knock-down convertible boat including end sections, a mid-section and means for detachably connecting the same, said end sections adapted when disconnected to be arranged in a vertical confronting relation on a vehicle to constitute a cab.

6. A knock-down convertible boat including end sections, a mid-section and means for detachably connecting the same, said end sections adapted when disconnected to be arranged in a vertical confronting relation on a vehicle to constitute a cab and interengageable means on the vehicle and end sections for securing the same in a cab forming position.

7. The combination with a vehicle having a platform of a convertible structure comprising a pair of detachably connected sections each having an open side and adapted when disconnected to be arranged in a vertical position on the platform with the open sides in laterally spaced confronting relation to constitute a cab, a rear curtain on the vehicle adapted to cover and bridge the space between the upper ends of said sections to constitute a roof for the cab, a curtain section adapted to detachably engage the free end of the vehicle curtain to bridge and cover the space between the rear sides of the sections, the said sections adapted when disconnected from the vehicle to be arranged and secured in a horizontal end to end mating relation with the open sides uppermost to constitute a boat and means for securing the sections to each other and to the vehicle body.

8. A convertible structure including a pair of end sections having upper open sides to constitute displaceable elements for a boat structure, a mid section for interpositioning between and securement to the inner ends of the end sections having openings therein for the admission of water to the level of the draft of the boat for stabilizing the same and to constitute a live box in combination with a vehicle having a platform adapted to receive and for securing in a vertical position thereon the said end sections with their open sides in confronting relation to constitute a cab, the said end sections having hinged seat elements adapted to be swung to right angular positions to constitute seats in either one of the sections and means for respectively supporting the free ends of the seat in their angularly disposed positions.

GEORGE ANDREW BROWN.